(12) United States Patent
Seldin et al.

(10) Patent No.: US 9,996,443 B2
(45) Date of Patent: Jun. 12, 2018

(54) USER ACTION DURATION

(71) Applicant: ENTIT SOFTWARE LLC, Sanford, NC (US)

(72) Inventors: Michael Seldin, Yehud (IL); Shai Embon, Yehud (IL); Avi Kabizon, Yehud (IL); Shalom Kramer, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 806 days.

(21) Appl. No.: 14/531,029

(22) Filed: Nov. 3, 2014

(65) Prior Publication Data
US 2016/0124622 A1 May 5, 2016

(51) Int. Cl.
*G04F 13/00* (2006.01)
*G06F 11/34* (2006.01)

(52) U.S. Cl.
CPC ...... *G06F 11/3438* (2013.01); *G06F 11/3419* (2013.01); *G06F 2201/865* (2013.01)

(58) Field of Classification Search
CPC ............... G06Q 30/02; G06Q 30/0202; G06F 3/04847; G06F 3/04842
See application file for complete search history.

(56) References Cited

U.S. PATENT DOCUMENTS

| | | | |
|---|---|---|---|
| 6,279,026 B1* | 8/2001 | Clarke | G06F 9/465 709/201 |
| 7,035,771 B2 | 4/2006 | Butt et al. | |
| 7,496,903 B2 | 2/2009 | Rees et al. | |
| 7,822,844 B2 | 10/2010 | Oulu et al. | |
| 8,291,421 B2* | 10/2012 | Oswald | G06F 9/4881 712/214 |
| 2009/0049429 A1 | 2/2009 | Greifeneder et al. | |
| 2013/0339284 A1* | 12/2013 | Rowles | G06Q 30/02 706/46 |

OTHER PUBLICATIONS

Chen, Q. A. et al., Qoe Doctor: Diagnosing Mobile App Qoe with Automated Ui Control and Cross-layer Analysis, Nov. 5-7, 2014, 14 pages.
Unknown, Rich Internet Applications: Design, Measurement, and Management Challenges, 12 pages.

* cited by examiner

*Primary Examiner* — Elias Desta

(57) ABSTRACT

In one implementation, a system for user action duration includes a monitor engine to monitor a number of async operations to be loaded on a user interface, a detection engine to determine a repeating async operation from the number of async operations that has a pattern of repeating timeouts, a removal engine to remove the repeating async operation from the number of async operations, and a calculation engine to calculate a total time for the remaining number of async operations based on a total timeout of each of the remaining number of async operations.

20 Claims, 5 Drawing Sheets

USER ACTION DURATION

BACKGROUND

A number of tools can determine load times for a screen of a user interface. The load times for the window can include determining a load time of the complete window. A load time value can be calculated for the window and displayed to a user. The load time value can be a time that it takes for a complete window to completely load and be displayed to a user.

DETAILED DESCRIPTION

Figure 1:
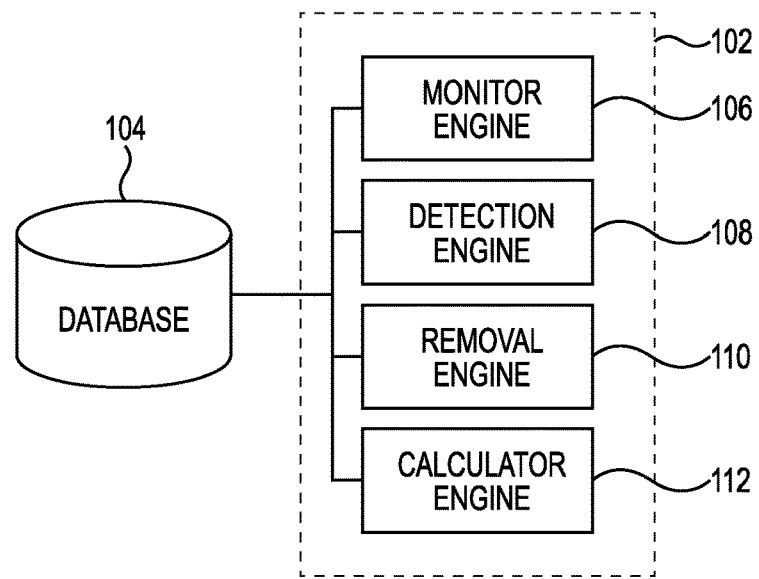
FIG. 1 illustrates a diagram of an example of a system for user action duration consistent with the present disclosure.

A number of methods, systems, and computer readable medium for user action duration are described herein. As used herein, user action duration refers to a monitored time period from a selection on a first screen to a completed loading of a second screen. The user action duration directly corresponds to a user interaction with the user interface. That is, the user action duration can correspond to a user experience of the user interface. Measuring and monitoring the user action duration can be utilized to determine a performance and end user experience of a user interface. In previous methods, the determined total load time of a screen or window of a user interface can be affected by a number of repeating load operations.

User action duration can include determining a number of async operations that are to be loaded on the user interface. As used herein, async operations are elements of a user interface that are loading in a non-synchronized manner. For example, the async operations can include a first element that starts loading at a first start time and also include a second element that starts loading at a second start time. As used herein, elements of the user interface can include, but are not limited to: images, selection tabs, videos, graphics, navigational tools, dropdown lists, search fields, icons, among other elements of a user interface.

User action duration can include determining a start time for each of a number of async operations. The start time for each of the number of async operations can be utilized to determine a bubbling timeout (e.g., bubbling time up, bubbling up time, bubbling time, etc.) time by adding a determined incremental timeout (e.g., defined period of time) to the start time. As used herein, the bubbling timeout is a time that bubbles up (e.g., removes) an async operation from monitoring. In some embodiments, the incremental timeout can be used to determine a number of repeating async operations. For example, it can be determined that an async operation is not a repeating async operation when there are no additional updates to the async operation during the incremental timeout. In some embodiments, the incremental timeout can be the same quantity of time that is added to each start time of the number of async operations. If there are multiple updates during the incremental timeout period, it can be determined that the async operation is a repeating async operation.

In some embodiments, a number of repeating async operations can be identified. As used herein, repeating async operations include operations that are updated repeatedly at a repeating timeout. For example, a repeating async operation can include a stock price ticker that updates stock prices at a particular repeating timeout (e.g., every minute, every five minutes, etc.). In some embodiments, the number of repeating async operations can be removed from determining the user action duration of a user interface.

In some embodiments, a total load time for the user interface can be calculated based on a greatest determined end time for the number of async operations. That is, calculating the total load time can include removing repeating async operations and determining an async operation with the greatest end time. Thus, the async operation with the greatest end time can be a last operation and/or element that is loaded by the user interface. As described herein, a total load time for the user interface can be calculated without a number of repeating operations. By removing the repeating operations a more accurate total load time for the user interface can be calculated.

Figure 2:
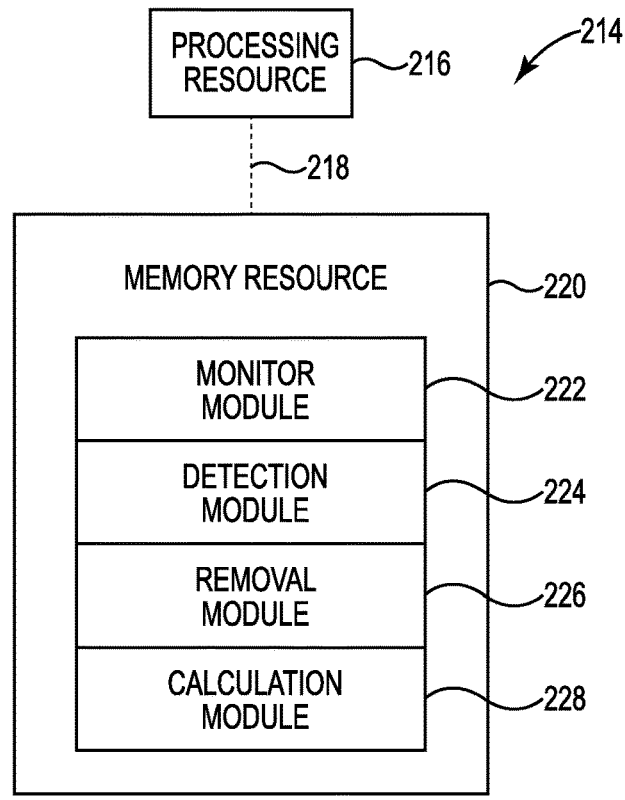
FIG. 2 illustrates a diagram of an example computing device consistent with the present disclosure.

FIGS. 1 and 2 illustrate examples of system 100 and computing device 214 consistent with the present disclosure. FIG. 1 illustrates a diagram of an example of a system 100 for user action duration consistent with the present disclosure. The system 100 can include a database 104, a user action duration system 102, and/or a number of engines (e.g., monitor engine 106, detection engine 108, removal engine 110, calculation engine 112). The user action duration system 102 can be in communication with the database 104 via a communication link, and can include the number of engines (e.g., monitor engine 106, detection engine 108, removal engine 110, calculation engine 112). The user action duration system 102 can include additional or fewer engines that are illustrated to perform the various functions as will be described in further detail in connection with FIGS. 3-6.

The number of engines (e.g., monitor engine 106, detection engine 108, removal engine 110, calculation engine 112) can include a combination of hardware and programming, but at least hardware, that is configured to perform functions described herein (e.g., monitor a number of async operations to be loaded on a user interface, determine an async operation from the number of async operations that have a repeating pattern of incremental timeout, remove the async operation from the number of async operations, calculate a total time for the remaining number of async operations based on a total timeout of each of the remaining number of async operations, etc.). The programming can include program instructions (e.g., software, firmware, etc.) stored in a memory resource (e.g., computer readable medium, machine readable medium, etc.) as well as hardwired program (e.g., logic).

The monitor engine 106 can include hardware and/or a combination of hardware and programming, but at least hardware, to monitor a number of async operations to be loaded on a user interface. As used herein, the number of async operations can include loading elements of a user interface that are not loading in a synchronized fashion. That is, each of the number of async operations can include elements that are loaded on a user interface and begin loading at different times. Monitoring the number of async operations can include monitoring a start time of each of the number of async operations and monitoring a timeout or stop time of each of the number of async operations. That is, the monitor engine 106 can monitor the loading of each of the number of async operations. In some embodiments, the monitor engine 106 can determine a start time for a number of async operations by monitoring a timestamp that is associated with each of the number of async operations.

The detection engine 108 can include hardware and/or a combination of hardware and programming, but at least hardware, to determine a repeating async operation from the number of async operations that has a pattern of repeating timeouts. The detection engine 108 can include hardware and/or a combination of hardware and programming, but at least hardware, to determine operations and/or elements that continually update at a number of repeating timeouts. For example, the async operations with a pattern of repeating timeouts can include an operation or element of the user interface that updates stock prices, current time, rankings, among other operations that can be updated periodically.

The removal engine 110 can include hardware and/or a combination of hardware and programming, but at least hardware, to remove the repeating async operation from the number of async operations. Removing the repeating async operation can include removing the repeating async operation from a calculation to determine a total load time of the user interface and/or a window of the user interface. In previous embodiments, repeating operations such as repeating async operations can create miscalculations of the total load of a user interface. The miscalculations can be due to incorporating operations that continuously reload and make it appear that the user interface window has not completed loading of all operations. By removing and/or ignoring the repeating async operations, a more accurate calculation of the total load time for the user interface can be determined by the calculation engine 112.

The calculation engine 112 can include hardware and/or a combination of hardware and programming, but at least hardware, to calculate a total time for the remaining number of async operations based on a total timeout of each of the remaining number of async operations. Calculating the total time for the remaining number of async operations can include bubbling up each of the number of async operations to a parent loader of the respective async operations. As used herein, bubbling up each of the number of async operations to the parent loader can include determining when an async operation has completed loading, determining that the async operation is past the incremental timeout, and associating the completed async operations with a loader that started the corresponding async operation.

Bubbling up a particular async operation can indicate that the particular async operation is not a repeating async operation and is not the last operation loading on the user interface and/or window of the user interface. The bubbled up async operations can be tagged with an indication that the async operation has completed. As described herein, the determination that the async operation has completed can be determined by monitoring a start time and end time of the async operation. Calculating user action duration as described herein can be beneficial in providing more accurate user interface load times, which can be utilized as a direct correlation to user experience of a user interface.

FIG. 2 illustrates a diagram of an example computing device 214 consistent with the present disclosure. The computing device 214 can utilize software, hardware, firmware, and/or logic to perform functions described herein.

The computing device 214 can be any combination of hardware and program instructions configured to share information. The hardware, for example, can include a processing resource 216 and/or a memory resource 220 (e.g., computer-readable medium (CRM), machine readable medium (MRM), database, etc.). A processing resource 216, as used herein, can include any number of processors capable of executing instructions stored by a memory resource 220. Processing resource 216 may be implemented in a single device or distributed across multiple devices. The program instructions (e.g., computer readable instructions (CRI)) can include instructions stored on the memory resource 220 and executable by the processing resource 216 to implement a desired function (e.g., determine a number of async operations that are to be loaded via a user interface, determine a start time for each of the number of async operations, add an incremental timeout to the start time for each of the number of async operations to determine a bubbling timeout for each of the number of async operations, perform a mechanism check at a time and determine a portion of the number of async operations that are past the bubbling timeout, calculate a total load time for the user interface based on a greatest start time for the number of async operations past the bubbling timeout, etc.).

The memory resource 220 can be in communication with a processing resource 216. A memory resource 220, as used herein, can include any number of memory components capable of storing instructions that can be executed by processing resource 216. Such memory resource 220 can be a non-transitory CRM or MRM. Memory resource 220 may be integrated in a single device or distributed across multiple devices. Further, memory resource 220 may be fully or partially integrated in the same device as processing resource 216 or it may be separate but accessible to that device and processing resource 216. Thus, it is noted that the computing device 214 may be implemented on a participant device, on a server device, on a collection of server devices, and/or a combination of the participant device and the server device.

The memory resource 220 can be in communication with the processing resource 216 via a communication link (e.g., a path) 218. The communication link 218 can be local or remote to a machine (e.g., a computing device) associated with the processing resource 216. Examples of a local communication link 218 can include an electronic bus internal to a machine (e.g., a computing device) where the memory resource 220 is one of volatile, non-volatile, fixed, and/or removable storage medium in communication with the processing resource 216 via the electronic bus.

A number of modules (e.g., monitor module 222, detection module 224, removal module 226, calculation module 228) can include CRI that when executed by the processing resource 216 can perform functions. The number of modules (e.g., monitor module 222, detection module 224, removal module 226, calculation module 228) can be sub-modules of other modules. For example, the detection module 224 and the removal module 226 can be sub-modules and/or contained within the same computing device. In another example, the number of modules (e.g., monitor module 222, detection module 224, removal module 226, calculation module 228) can comprise individual modules at separate and distinct locations (e.g., CRM, etc.).

Each of the number of modules (e.g., monitor module 222, detection module 224, removal module 226, calculation module 228) can include instructions that when executed by the processing resource 216 can function as a corresponding engine as described herein. For example, the monitor module 222 can include instructions that when executed by the processing resource 216 can function as the monitor engine 106. In another example, the detection module 224 can include instructions that when executed by the processing resource 216 can function as the detection engine 108. In another example, the removal module 226 can include instructions that when executed by the processing resource 216 can function as the removal engine 110. Furthermore, the calculation module 228 can include instructions that when executed by the processing resource 216 can function as the calculation engine 112.

Figure 3:
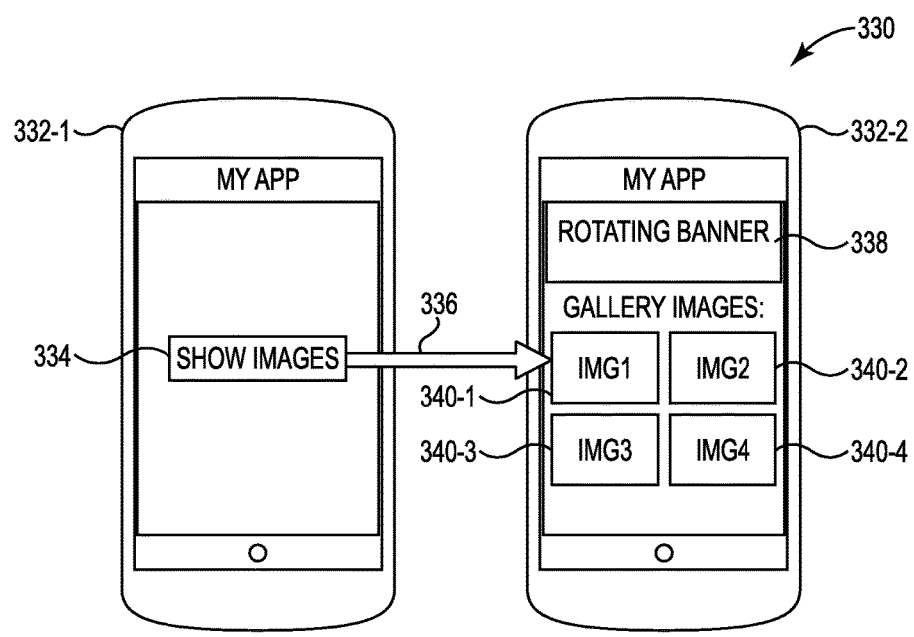
FIG. 3 illustrates a display for user action duration consistent with the present disclosure.

FIG. 3 illustrates a display 330 for user action duration consistent with the present disclosure. The display 330 can be displayed on a device. The device can be a computing device with a display that displays a user interface that can enable selection of a number of elements.

The device can display a first screen 332-1 and upon selection of an element 334 can execute 336 a number of async operations 340-1, 340-2, 340-3, 340-4, 338 that are displayed on a second screen 332-1. That is, a user can select element 334 to "show images" and the device can display a number of images (e.g., image 1, image 2, image 3, image 4, etc.) via the number of async operations 340-1, 340-2, 340-3, 340-4, 338. As described herein, the number of async operations 340-1, 340-2, 340-3, 340-4, 338 can each be loaded by a loader of the device at a number of different start times. For example, image 1 can be loaded via an async operation 340-1 at a first time and image 2 can be loaded via an async operation 340-2 at a second time. In this example, the first time can be a different time than the second time.

In some embodiments, the number of async operations 340-1, 340-2, 340-3, 340-4, 338 can include a repeating async operation 338 (e.g., rotating banner, stock price ticker, weather updates, etc.) that can continually update even when the remaining async operations 340-1, 340-2, 340-3, 340-4, are completely loaded. As described herein, the repeating async operation 338 can be identified as a repeating async operation 338 and removed from a calculation of the total time for loading of the second screen 332-2. That is, the calculation of the total time can include calculating the total load time of the async operations 340-1, 340-2, 340-3, 340-4, without the load time of the repeating async operation 338.

Identifying the repeating async operation 338 can include adding an incremental timeout to each start time of the number of async operations 340-1, 340-2, 340-3, 340-4, 338. The incremental timeout can be added to each start time of the async operations 340-1, 340-2, 340-3, 340-4, 338 and the async operations 340-1, 340-2, 340-3, 340-4, 338 can be monitored during the incremental timeout to determine if the async operation updates during the incremental timeout. The repeating async operation 338 can update during the incremental timeout and indicate that the repeating async operation 338 may continue to update continuously.

As described herein, removing the repeating async operations 338 from the calculation of the total load time can increase the accuracy of the total load time for the second screen 332-2 and provide a more accurate representation of the total load time of the second screen 332-2 compared to previous methods.

Figure 4:
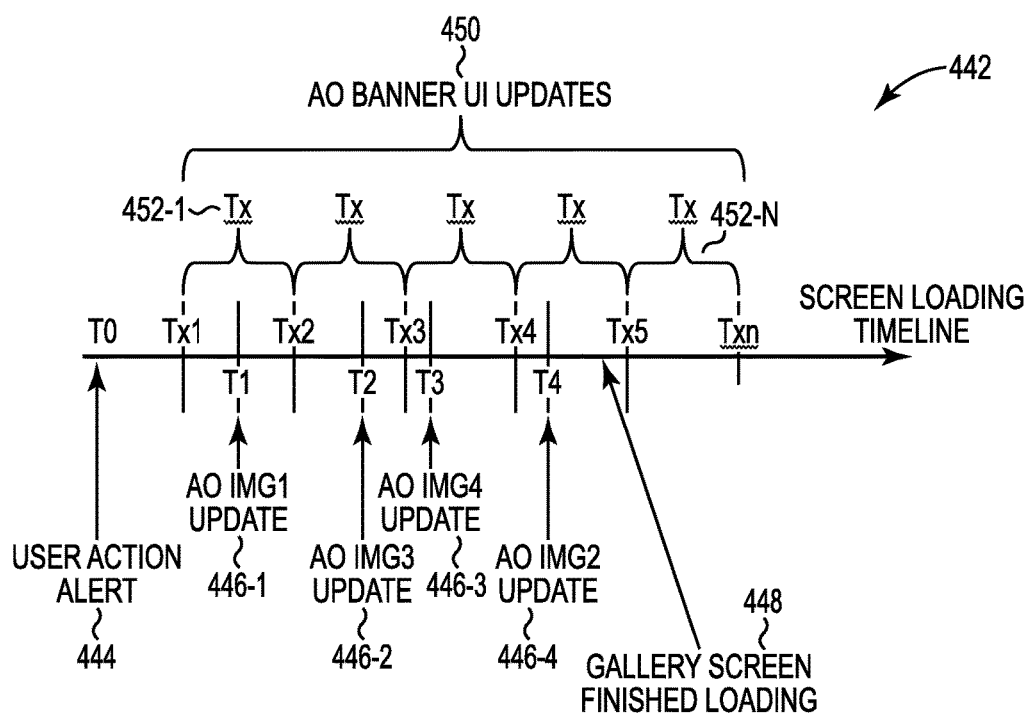
FIG. 4 illustrates a timeline for user action duration consistent with the present disclosure.

FIG. 4 illustrates a timeline 442 for user action duration consistent with the present disclosure. The timeline 442 can be a representation of start times/end times for each of a number of async operations. The timeline 442 can start at a user action 444. The user action 444 can include a selection of an element that includes instructions to load a number of async operations. For example, the user action 444 can include a selection of an element to "show images" on a first screen to initiate the number of async operations to load a number of images.

In some embodiments, there can be a repeating async operation 450 (e.g., async operation banner, stock ticker, etc.) that can load at each of a number of time intervals 452-1, 452-N. For example, as shown on the timeline 442, the repeating async operation 450 can start loading at a time (Tx1) and start loading again and/or update at a second time (Tx2). As described herein, the repeating async operation 450 can continuously update at a repeating time interval (e.g., Tx1, Tx2, Tx3, Tx4, Tx5, etc.) through the timeline 442. As described herein, the repeating async operation 450 can be identified by monitoring the pattern of repeating time intervals associated with the repeating async operation 450. In some embodiments, the repeating async operation 450 can be identified by monitoring additional start times for loading the repeating async operation 450 during an incremental time interval. In addition, the identified repeating async operation 450 can be removed from calculating the total load time of the user interface. That is, only non-repeating async operations can be utilized to calculate the total load time of the user interface.

As described herein, a start time of each of the number of async operations can be monitored and identified. For example, a first start time for a first image 446-1 (e.g., image 1, img1, etc.) can be identified at T1, a second start time for a third image 446-2 (e.g., image 3, img3, etc.) can be identified at T2, a third start time for a fourth image (e.g., image 4, img4, etc.) can be identified at T3, and a fourth time for a second image (e.g., image 2, img2, etc.) can be identified at T4.

As described further herein, an incremental stop time can be added to each identified start time for each of the number of async operations. In some embodiments, the incremental stop time can be a designated quantity of time that is predicted for any additional updates to start that might identify a repeating async operation 450. For example, the incremental stop time can be designated at 30 seconds. In this example, the incremental stop time can be added to each identified start time to calculate a bubbling timeout for each of the number of async operations. The total load time for the user interface can be determined when the number of async operations have reached the last bubbling timeout. For example, the incremental stop time can be added to async operation 446-4 and it can be determined that async operation 446-4 is the final loaded async operation to load from the number of async operations. In this example, the total load time 448 for the user interface can be the time from the user action start at 444 to the stop time associated with the async operation 446-4.

Figure 5:
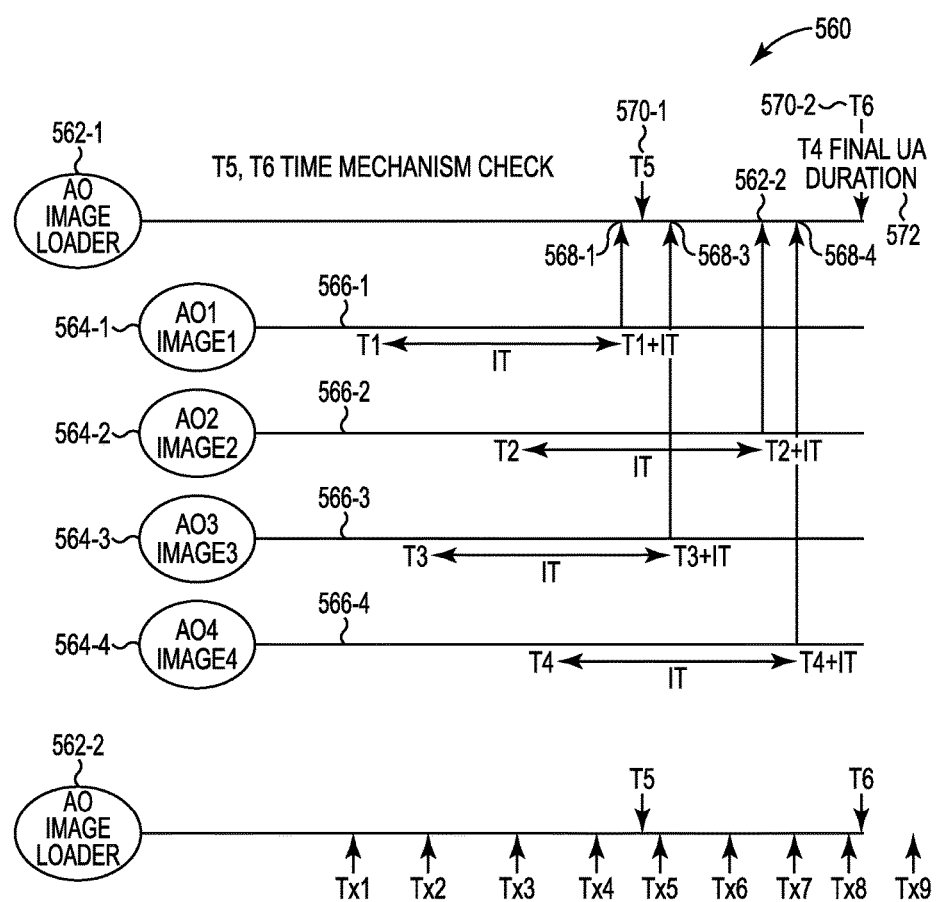
FIG. 5 illustrates a time flow for loading async operations consistent with the present disclosure.

FIG. 5 illustrates a time flow 560 for loading async operations consistent with the present disclosure. The time flow 560 can include a number of async operation loaders 562-1, 562-2 that can be utilized by a system and/or computing device to load a number of async operations 564-1, 564-2, 564-3, 564-4. In some embodiments, an async operation loader 562-1 can be utilized to load a number of async operations 564-1, 564-2, 564-3, 564-4 and an async operation loader 562-2 can be utilized to load a number of repeating async operations.

In some embodiments, the number of async operation loaders 562-1, 562-2 can begin loading each of the number of async operations 564-1, 564-2, 564-3, 564-4 at a number of different load times 566-1, 566-2, 566-3, 566-4. For example, the async operation loader 562-1 can load: a first async operation 564-1 at a first time (T1) 566-1, a second async operation 564-2 at a second time (T2) 566-2, a third async operation 564-3 at a third time (T3) 566-3, and/or a fourth async operation 564-4 at a fourth time (T4) 566-4.

Each of the load times 566-1, 566-2, 566-3, 566-4 can be identified. As described herein, an incremental timeout (IT) can be added to each of the identified load times 566-1, 566-2, 566-3, 566-4. In some embodiments, a load time 568-1, 568-2, 568-3, 568-4 for each of the number of async operations 564-1, 564-2, 564-3, 564-4 can be calculated by subtracting the load time from a user action start time.

When each of the async operations 564-1, 564-2, 564-3, 564-4 reach a corresponding bubbling timeouts 568-1, 568-2, 568-3, 568-4 the async operation is bubbled up to the async operation loader 562-1, 562-2. The number of async operations 564-1, 564-2, 564-3, 564-4 can be monitored to determine which of the number of async operations 564-1, 564-2, 564-3, 564-4 have bubbled up to the async operation loader 562-1, 562-2 and which of the number of async operations 564-1, 564-2, 564-3, 564-4 are still within incremental timeout (IT) period.

Bubbling up the number of async operations 564-1, 564-2, 564-3, 564-4 to the async operation loader 562-1, 562-2 can be utilized to determine a total load time for the user interface 572 by determining a last async operation to bubble up to the async operation loader 562-1, 562-2. For example, async operation 564-1 can be bubbled up at 568-1, async operation 564-2 can be bubbled up at 568-2, async operation 564-3 can be bubbled up at 568-3, and async operation 564-4 can be bubbled up at 568-4. In this example, the total load time of the user interface 572 can be determined to be at the load time 566-4 of async operation 564-4, since it is the last async operation to be bubbled up to the async operation loader 562-1.

Determining which async operations 564-1, 564-2, 564-3, 564-4 have bubbled up to the async operation loader 562-1, 562-2 can include executing a number of time out mechanism checks 570-1, 570-2 at a number of times during the loading time of the number of async operations 564-1, 564-2, 564-3, 564-4. For example, a time out mechanism check 570-1 can be executed at time (T5) and another time out mechanism check 570-2 can be executed at time (T6). The time out mechanism checks 570-1, 570-2 can be executed to determine which of the async operations 564-1, 564-2, 564-3, 564-4 have bubbled up to the async operation loader 562-1, 562-2. For example, the time out mechanism check 570-1 can be executed to determine that async operation 564-1 has bubbled up to the async operation loader 562-1 and that aysnc operations 564-2, 564-3, 564-4 are currently within the incremental timeout (IT) period. In another example, the time out mechanism check 570-2 can be executed to determine that async operations 564-1, 564-2, 564-3, 564-4 have bubbled up to the async operation loader 562-1 and that the user interface has completed the loading of the aysnc operations 564-1, 564-2, 564-3, 564-4. That is, the async operations 564-1, 564-2, 564-3, 564-4 were determine to not be repeating async operations and therefore were bubbled up to the async operation loader 562-1.

In some embodiments, there can be a number of repeating async operations. As described herein, the number of repeating async operations can be operations that continually update on a user interface. In some embodiments, the repeating async operations can be loaded by the async operations loader 562-2. The async operations can be updated at a number of incremental times (e.g., Tx1, Tx2, Tx3, TxN, etc.). The repeating async operations can be separated from the async operations 564-1, 564-2, 564-3, 564-4 and instead of bubbling up to the async operation loader 562-1 the repeating async operations can be bubbled up to the async operation loader 562. Thus, the repeating async operations are not considered when calculating the total load time of the user interface 572.

By separating the repeating async operations from the async operations 564-1, 564-2, 564-3, 564-4 and bubbling up the async operations into separate async operations loaders 562-1, 562-2 can provide a better representation of the total load time of the user interface 572 compared to previous methods.

Figure 6:
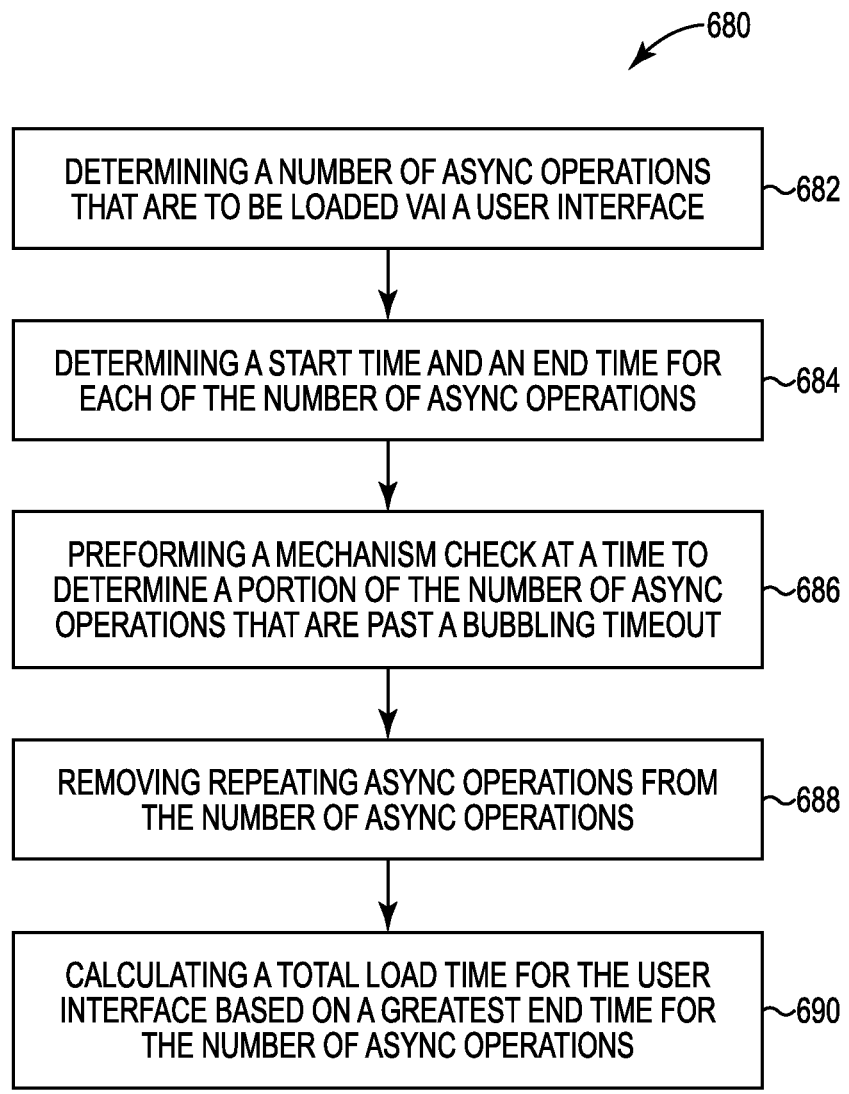
FIG. 6 is a flow chart of an example of a method for user action duration consistent with the present disclosure.

FIG. 6 is a flow chart of an example of a method 680 for user action duration consistent with the present disclosure. The method 680 can be executed by a computing device and/or system as described in reference to FIG. 1 and FIG. 2. The method 680 can provide a better representation of the total load time of the user interface compared to previous methods.

At box 682, the method 680 can include determining a number of async operations that are to be loaded via a user interface. Determining the number of async operations that are to be loaded can include determining operations that will load on a particular screen of the user interface. That is, each of a number of async operations can be determined and the determined async operations can be monitored. Monitoring the number of determined async operations can include determining a start time of each of the determined async operations.

At box 684, the method 680 can include determining a start time and an end time for each of the number of async operations. Determining a start time for each of the number of async operations can include monitoring each of the number of async operations to determine when each of the number of async operations are loaded by an async operation loader. Determining the end time for each of the number of async operations can include calculation the end time for each of the number of async operations by adding an incremental timeout to each of the determined start times of the number of async operations.

At box 686, the method 680 can include performing a mechanism check at a time to determine a portion of the number of async operations that are past the end time. As described herein, a mechanism check can be executed at a number of different times to determine which async operations have reached the end time and have been bubbled up to the async operation loader. The mechanism check can be utilized to determine a number of async operations that are still loading and have not reached the end time.

At box 688, the method 680 can include removing repeating async operations from the number of async operations. As described herein, the repeating async operations can be removed from the number of async operations and bubbled up to a separate async operation loader in order to remove the repeating async operations from the calculation for a total load time for the user interface. The repeating async operations can be determined based on the mechanism check determining that the async operation has been bubbled up and has a new start time and calculated end time.

At box 690, the method 680 can include calculating a total load time for the user interface based on a greatest end time for the number of async operations. As described herein, the total load time for the user interface can be calculated based on the async operations without the repeating async operations. The calculated total load time for the user interface based on the method 680 can be a more accurate and a better representation of total load time for a particular screen and/or window of the user interface compared to previous methods.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a number of" something can refer to one or more such things. For example, "a number of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed is:

1. A system comprising:
one or more hardware components to:
determine a number of async operations to be loaded on a user interface;
determine a repeating async operation from the number of async operations that has a pattern of repeating timeouts;
remove the repeating async operation from the number of async operations; and
calculate a total time for the remaining number of async operations based on a total timeout of each of the remaining number of async operations; and
a display device to display the calculated total time for the remaining number of async operations.

2. The system of claim 1, wherein the determined repeating async operation is a banner that is continually updated at the repeating timeouts.

3. The system of claim 1, wherein the one or more hardware components are further to determine a total timeout for each of the number of async operations.

4. The system of claim 1, wherein the one or more hardware components are further to determine a start time via a timestamp associated with each of the number of async operations.

5. The system of claim 1, wherein the one or more hardware components are further to determine a number of mechanism checks for a timeline of the number of async operations.

6. The system of claim 5, wherein the one or more hardware components are further to determine a total time via a summation of a start time and a total timeout for each of the number of async operations.

7. The system of claim 1, wherein each of the remaining number of async operations are bubbled to a parent loader based on the one or more hardware components determining the bubbling timeout.

8. A non-transitory computer readable medium storing instructions executable by a processing resource to cause the processing resource to:
determine a number of async operations that are to be loaded via a user interface;
determine a start time for each of the number of async operations;
add an incremental timeout to the start time for each of the number of async operations to determine a bubbling timeout for each of the number of async operations;
perform a mechanism check at a certain time and determine a portion of the number of async operations that are past the bubbling timeout;
remove repeating async operations from the number of async operations;
calculate a total load time for the user interface based on a greatest start time for the number of async operations past the bubbling timeout; and
display the calculated total load time for the user interface on a display device.

9. The medium of claim 8, wherein each of the async operations are loaded by a parent loader.

10. The medium of claim 9, wherein the portion of the number of async operations are bubbled up to the parent loader at the bubbling timeout.

11. The medium of claim 8, wherein the repeating async operations are updated at a repeating interval.

12. A method comprising:
determining, by a processing resource, a number of async operations that are to be loaded via a user interface of a computing device responsive to a user selection on the computing device;
determining, by the processing resource, a start time and an end time for each of the number of async operations;
performing, by the processing resource, a mechanism check at a time to determine a portion of the number of async operations that are past a bubbling timeout;
removing, by the processing resource, repeating async operations from the number of async operations;
calculating, by the processing resource, a total load time for the user interface based on a greatest end time for the number of async operations; and
displaying, by the processing resource, the calculated total load time for the user interface on a display device.

13. The method of claim 12, wherein removing repeating async operations includes removing async operations that have repeating updates prior to the bubbling timeout.

14. The method of claim 12, wherein the start time is determined by a timestamp associated with a start of a corresponding async operation.

15. The method of claim 12, wherein the mechanism check determines the portion of the number of async operations that have completed a load process.

16. The system of claim 1, wherein the one or more hardware components are to determine the number of async operations to be loaded on a user interface of a computing device responsive to a user selection on the computing device.

17. The system of claim 1, wherein the async operations include at least one of images, selection tabs, videos, graphics, navigational tools, dropdown lists, search fields, or icons.

18. The non-transitory computer readable medium of claim 8, wherein the instructions are further to cause the processing resource to determine the number of async operations to be loaded on a user interface of a computing device responsive to a user selection on the computing device.

19. The non-transitory computer readable medium of claim 8, wherein the async operations include at least one of images, selection tabs, videos, graphics, navigational tools, dropdown lists, search fields, or icons.

20. The method of claim 12, wherein the async operations include at least one of images, selection tabs, videos, graphics, navigational tools, dropdown lists, search fields, or icons.

* * * * *